M. B. THURBER.
SPARK COIL AND SPARK PLUG TESTER.
APPLICATION FILED DEC. 16, 1916.
1,231,970.
Patented July 3, 1917.
2 SHEETS—SHEET 2.
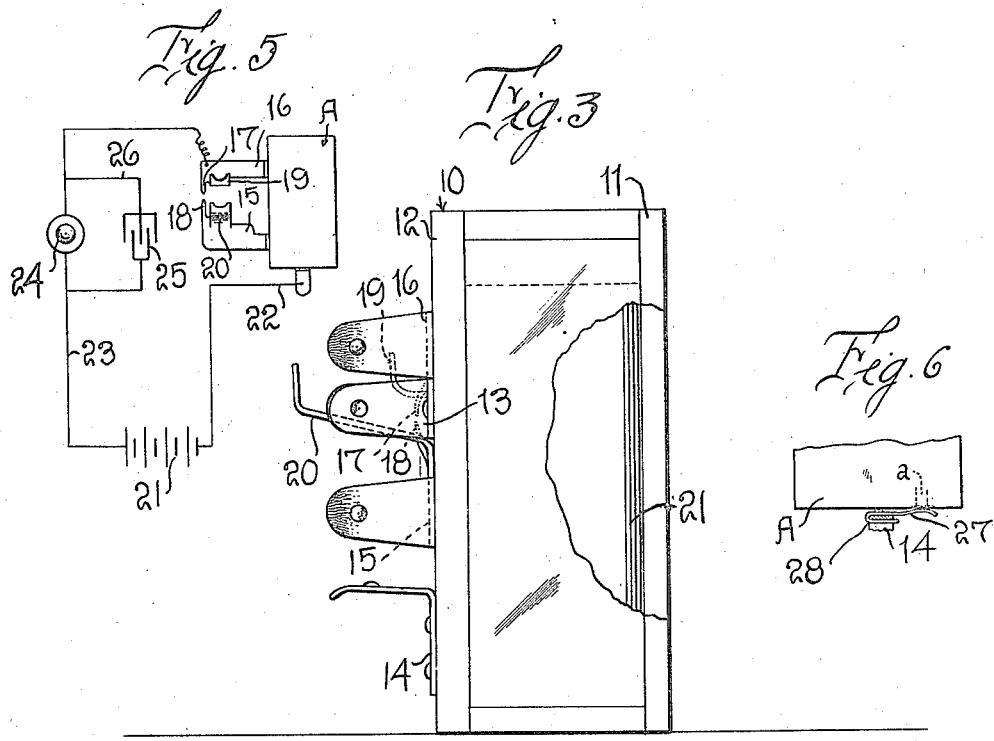
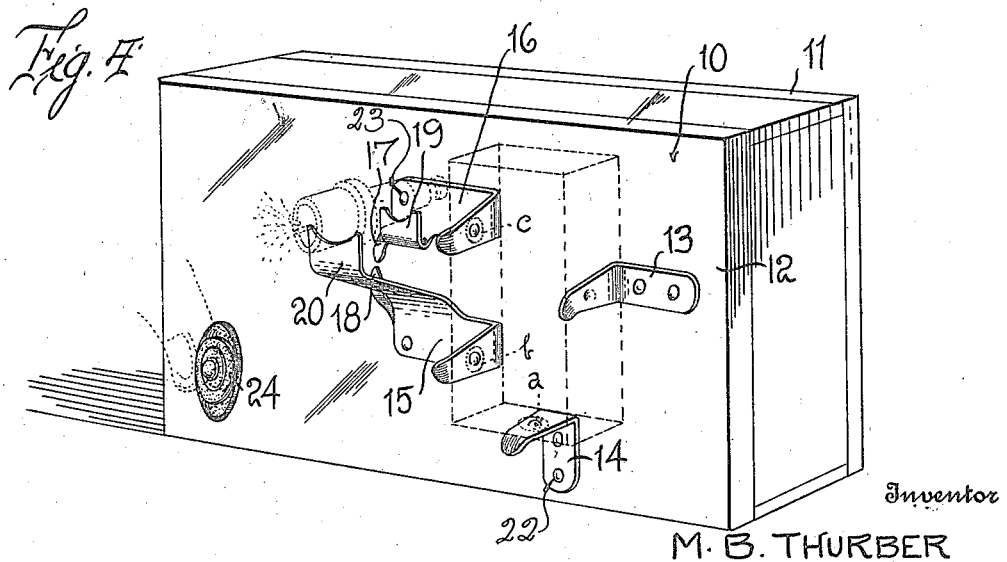
Inventor
M. B. THURBER
By Watson E. Coleman
Attorney

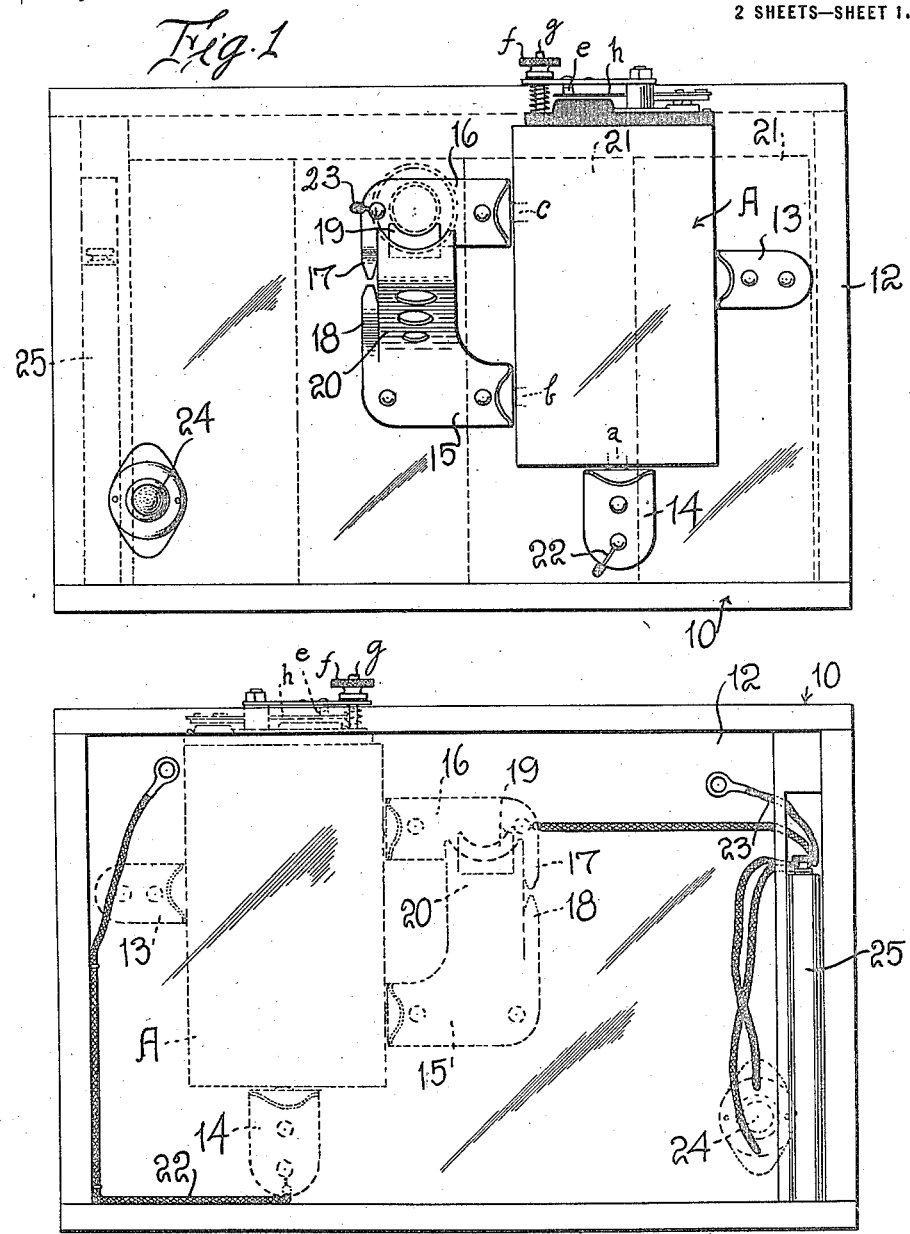

UNITED STATES PATENT OFFICE.

MATT B. THURBER, OF TECUMSEH, NEBRASKA.

SPARK-COIL AND SPARK-PLUG TESTER.

1,231,970.  Specification of Letters Patent.  Patented July 3, 1917.

Application filed December 16, 1916. Serial No. 137,400.

*To all whom it may concern:*

Be it known that I, MATT B. THURBER, a citizen of the United States, residing at Tecumseh, in the county of Johnson and State of Nebraska, have invented certain new and useful Improvements in Spark-Coil and Spark-Plug Testers, of which the following is a specification, reference being had to the accompanying drawings.

This invention relates to spark testing devices and particularly to a device designed for the testing of spark coils, the device being further adapted for the testing of spark plugs. Specifically considered, one of the objects of the invention is to provide a testing device so constructed that a standard spark coil inclosed in its usual casing may be disposed within clips mounted upon the casing of the instrument, certain of the clips forming contacts adapted to engage with the exposed terminals of the spark coil, these contact clips in turn being operatively connected to a battery, and there being a switch or push button arranged in the circuit so that when the switch is closed current will pass through the spark coil and across a spark gap formed on the terminals of the clips or across a spark gap formed in the usual spark plug supported by said clips and being tested.

Still another object of the invention is to provide means for testing coils which have no vibrator or have their vibrator short circuited for use in connection with a master vibrator.

A further object of the invention is to provide means for testing ignition coils such as are used in automobiles and with internal combustion engines to see if the coils are performing their proper function of supplying sparks having the necessary length and volume to cause proper ignition and in this connection to provide a device of this character so supported that the operator may have his hands free and tune or adjust the vibrator to the best frequency for producing sparks.

Other objects will appear in the course of the following description.

My invention is illustrated in the accompanying drawings, wherein—

Figure 1 is a front view of a spark testing mechanism embodying my invention, the battery cells being shown in dotted lines;

Fig. 2 is an inside face view of the casing inclosing the battery cells, the cells being removed and the conductors leading to the several cells being detached;

Fig. 3 is an end elevation of the device;

Fig. 4 is a perspective view thereof;

Fig. 5 is an electrical diagram showing the wiring of this device;

Fig. 6 is an elevation of the lower end of a coil box showing the clip 14 and the extension member 27 attached thereto.

Referring to these figures, it will be seen that my invention includes a battery and condenser inclosing casing designated generally 10, this casing, as illustrated in Fig. 4, being approximately rectangular in form and having a door 11 at its rear and a front plate 12, the front plate being rigidly attached to the casing. The casing is made of wood or any other suitable non-conductive material. Disposed upon the face of the casing are the resilient metallic clips 13, 14, 15 and 16. The clip 14 is angular in form and has a tongue extending outward approximately at right angles to the face of the casing, this tongue being slightly rounded and being resilient. The clip 13 is also angular in form but its tongue is disposed in a vertical plane instead of a horizontal plane and extends out at right angles to the casing. The clips 15 and 16 are disposed opposite to the clip 13 and have their tongues disposed in a vertical plane. The tongues of the clips 15 and 16 are disposed in staggered relation to the clip 13. The tongues of the clips 14, 15 and 16 form contacts adapted to engage respectively with the contacts $a$, $b$ and $c$ of a spark coil inclosed within the usual box or casing A. The internal construction of the spark coil is not illustrated for the reason that this is a common form of coil particularly constructed to be used with a certain type of motor cars or engines. The coil is provided with the usual vibrator $d$ coacting with a contact $e$, this contact being adjustable toward or from the vibrator by means of the thumb nut $f$ having screw-threaded engagement with the post $g$. This construction is as usual in spark coils and forms no part of my invention. As before stated, spark coils of this character have three terminals $a$, $b$ and $c$ which are in the form of metallic plugs extending through the side walls of the casing A. The plug $a$ extends through the bottom of the box A while the plugs $c$ and $b$ extend through one side wall of the box A. When the spark coil box is in place, as illustrated in Fig. 1, the several terminals, $a$, $b$ and $c$ will electrically engage with the spring tongues of the clips 14, 15 and 16, as illustrated most clearly in Fig. 1.

The base of the clip 16 is attached to the front wall of the casing 10 in any suitable manner as by screws, and is formed with a downwardly extending spark point 17 which is outwardly offset from the plane of the base of the clip 16. The clip 15, as illustrated clearly in Fig. 4, is also formed with an outwardly and upwardly extending spark point or sparking terminal 18. These terminals 17 and 18 are disposed in spaced relation to each other to provide a spark gap. Preferably also the base of the clip 16 is formed with an outwardly and upwardly turned extension 19 whose upper edge is concavely curved to form a seat for one end of a spark plug and the clip 15 is also formed with an outwardly and upwardly projecting extension 20 having a spark coil seat, this extension 20 projecting out beyond the extension 19 so that a spark plug may be supported upon these seats, as illustrated most clearly in Fig. 4.

Disposed within the casing 10 are the dry cells 21. The casing is ordinarily of such size as to contain four standard dry cells which are connected to each other in the usual manner so as to form a battery. The battery at one end is connected by means of a wire 22 with the base of the clip 14, as most clearly illustrated in Fig. 5. From the other pole of the battery extends a wire 23, this wire extending to the clip 16. The wire 23 is broken at one point and at this break is disposed a switch designated generally 24 and consisting of an ordinary push button, though any other form of switch may be used. The push button is more convenient, however. Disposed within the casing 10 is a condenser designated generally 25 which is connected with the wire 23 across the switch 24 by the wires 26.

The operation of this device is as follows: When it is desired to test the spark coil, the coil box A is disposed in place between the several clips 13, 14, 15 and 16, as shown clearly in Fig. 1. Under these circumstances if the push button switch be operated, sparks will jump across the gap between the terminals 17 and 18 and the length and volume of the sparks can be readily determined. If the coils are not functioning properly the weak and irregular sparks will be plainly observable at the terminals 17 and 18 and if the coil has a vibrator such as is illustrated, this vibrator may be tuned or adjusted with great accuracy so that the coil will produce the best possible spark. Furthermore as the coil is supported by the clips 13, 14, 15 and 16, the operator has his hands perfectly free to adjust the thumb nut $f$ and so adjust the vibrator to exactly the degree required. If it be desired to test a spark plug, the spark plug is laid upon the seats formed on the extensions 19 and 20, as illustrated in dotted lines in Fig. 4, and thus a circuit is completed through the electrodes of the spark plug and the spark will jump across the spark gap, the character of the spark indicating the condition of the plug. The push button 24 is provided in the circuit of the tester so as to close and open the circuit during the test and across this push button is provided the condenser 25, as previously stated, so that the push button can be used in lieu of the vibrator for the purpose of testing coils that have no vibrator or have their vibrators short circuited for use in connection with a master vibrator.

In certain old style coils the contact $a$ is not disposed in such position that it may be engaged by the contact clip 14 but to one side of the plane of this clip and hence I have provided an extension contact which I have illustrated in Fig. 6 and designated 27 which is so constructed that it may be slipped on the outwardly projecting tongue of the clip 14 and press upward against the terminal $a'$ in the manner illustrated in Fig. 6. With the device as described certain forms of ignition coils now on the market can be quickly tested to see if they are performing their function of supplying sparks of the necessary length and volume to secure proper ignition and by this device the vibrator can be tuned or adjusted to secure the best possible results. It will be seen that the several clips 13, 14, 15 and 16 form a rack for the ready introduction of the coil box to be tested and that these clips are further so arranged that the coil box is held firmly in place with the brass bosses or terminals of the coil in good electrical engagement with the tongues of the clips 13, 14, 15 and 16. The clip 13 provides sufficient pressure to hold the coil in place with its terminals against the opposite clips 15 and 16 so that a good electrical connection is secured.

I have not illustrated the specific construction of the spark coil incased within the box A as this is a common and well-known arrangement but it may be stated that the primary coil is connected at one end to the vibrator and at the other end to the contact button or stud $a$ while the secondary coil is connected at one end to the button or stud $b$. The contact button or stud $c$ has a common connection to the vibrator, contact and to the other terminal of the secondary coil. Thus it will be seen that the contact clips 14 and 16 are connected in circuit with the battery through the push button and condenser and that the contact clips 14 and 15 are connected to the secondary coil and to each other across the spark gap.

While I have illustrated a certain embodiment of my invention which is particularly adapted to certain coils now on the market, I wish it understood that this construction may be varied in many ways so as to fit it for use with other coils without departing from the spirit of the invention.

I wish it understood that I do not claim to be the inventor of the broad idea of the spark plug tester illustrated in the accompanying drawings and described by me, but that my invention particularly resides in the means for supporting and testing spark coils and the particular arrangement and construction of the clips whereby the spark coil box is supported, these clips being so constructed as to also support a spark plug.

Having described my invention, what I claim is:

1. A tester for spark coils including a supporting member, a plurality of resilient clips mounted on the supporting member and forming a coil box support and also forming contacts arranged for engagement with the terminals of the spark coil, two of the clips having opposed spaced spark points forming a spark gap, a source of energy electrically connected in a circuit with certain of the clips, and a switch disposed in the circuit between one of said clips and the source of energy.

2. A tester for spark coils including a supporting member, resilient coil box supporting clips mounted thereon but insulated therefrom and disposed in spaced relation to each other, said clips forming contacts arranged for engagement with the terminals of the spark coil, two of said clips having opposed spaced spark points forming a spark gap, a source of energy connected in circuit with certain of said clips, a switch disposed in the circuit between one of said contact clips and the source of energy, and a condenser disposed in a shunt circuit connected in said main circuit on each side of the switch.

3. A tester for spark coils including a supporting member, a plurality of coil box supporting clips mounted thereon but insulated therefrom and forming contacts arranged for engagement with the terminals of a spark coil, two of the contact clips having opposed spaced spark points forming a spark gap and having extensions formed to provide spark plug seats, a source of energy arranged in circuit with said clips, and a switch disposed in the circuit.

4. A tester for spark coils including a supporting member, a plurality of coil box supporting clips mounted thereon but insulated therefrom and forming contacts arranged for engagement with the terminals of a spark coil, two of the contact clips having opposed spaced spark points forming a spark gap and having extensions formed to provide spark plug seats, a source of energy arranged in circuit with said clips, a switch disposed in the circuit, and a condenser disposed in a shunt circuit connected in said main circuit on each side of the switch.

5. A tester for spark coils including a supporting member, coil box supporting clips mounted thereon but insulated therefrom to form contacts arranged for engagement with the terminals of a spark coil, two of the clips being arranged for engagement with the terminals of the secondary coil and having opposed spaced spark points forming a spark gap, electrical connections connected in circuit between the clips electrically engaging the terminals of the primary coil and a source of energy, and a switch disposed in said circuit.

6. A tester for spark coils including a supporting member, coil box supporting clips mounted thereon in spaced relation to each other and forming contacts engageable with the terminals of a spark coil, one of said clips being arranged to electrically engage with a terminal of the primary coil another of the clips being arranged to electrically engage with a terminal common to both the primary and the secondary coils, and a third clip arranged to electrically engage with the other terminal of the secondary coil, the two last named clips being spaced from each other and having spaced spark points and the first and second named clips being connected in circuit with a source of energy, and a switch in said circuit.

7. A tester for spark coils including a supporting member, coil box supporting clips mounted thereon in spaced relation to each other and forming contacts engageable with the terminals of a spark coil, one of said clips being arranged to electrically engage with a terminal of the primary coil, another of the clips being arranged to electrically engage with a terminal common to both the primary and the secondary coils, and a third clip arranged to electrically engage with the other terminal of the secondary coil, the two last named clips being spaced from each other and having spaced spark points and the first and second named clips being connected in circuit with a source of energy, a switch in said circuit, and a condenser disposed in a shunt circuit connected to said main circuit on each side of the switch.

8. A testing device for spark coils including a battery containing casing, a battery therein, upper and lower metallic members mounted upon one wall of the casing and having resilient tongues projecting out from the wall in vertical spaced relation to each other, a metallic member having a resilient tongue mounted upon the wall of the casing in lateral spaced relation to the first named members and on a line between said first named members, a metallic member disposed on a line below said members and between the first and second named members and having an outwardly projecting resilient tongue, the tongues of said members constituting coil box engaging clips and contacts, an electrical connection from the last named metallic member to the battery, an electrical connection from the uppermost first named metallic members to said battery whereby to electrically connect said members in circuit with the battery, a push button switch disposed in said circuit, a condenser mounted within said casing and having electrical connections to said circuit on each side of the push button switch, and sparking terminals mounted upon said casing and electrically connected to the upper and lower first named metallic members, said sparking terminals being spaced from each other to provide a spark gap.

9. A testing device for spark coils including a battery containing casing, a battery therein, upper and lower metallic members mounted upon one wall of the casing and having resilient tongues projecting out from the wall in vertical spaced relation to each other, a metallic member having a resilient tongue mounted upon the wall of the casing in lateral spaced relation to the first named members and on a line between said first named members, a metallic member disposed on a line below said members and between the first and second named members and having an outwardly projecting resilient tongue, the tongues of said members constituting coil box engaging clips and contacts, an electrical connection from the last named metallic member to the battery, an electrical connection from the uppermost of the first named metallic members to said battery whereby to electrically connect said members in circuit with the battery, a push button switch disposed in said circuit, a condenser mounted within said casing and having electrical connections to said circuit on each side of the push button switch, and sparking terminals mounted upon said casing and electrically connected to the upper and lower first named metallic members, said sparking terminals being spaced from each other to provide a spark gap, said upper and lower first named metallic members being also formed with metallic extensions disposed with their terminal ends in line with each other and formed to support the extremities of a spark plug.

In testimony whereof I hereunto affix my signature in the presence of two witnesses.

MATT B. THURBER.

Witnesses:
L. C. CHAPMAN,
G. W. WILLS.